US006751797B1

(12) United States Patent
Desgranges et al.

(10) Patent No.: US 6,751,797 B1
(45) Date of Patent: Jun. 15, 2004

(54) SYSTEM AND METHOD FOR MANAGING THE PERSISTENCE OF EJB COMPONENTS IN A DIRECTORY ACCESSED VIA LDAP (75) Inventors: Paul Desgranges, Grenoble (FR); Philippe Coq, Gieres (FR); François Exertier, St Martin du Riage (FR)

(73) Assignee: Bull S.A., Les Clayes sous Bois (FR)

( * ) Notice: Subject to any disclaimer, the term of this patent is extended or adjusted under 35 U.S.C. 154(b) by 534 days.

(21) Appl. No.: 09/696,231

(22) Filed: Oct. 26, 2000

(30) Foreign Application Priority Data

Oct. 26, 1999 (FR) .......................................... 99 13373

(51) Int. Cl.[7] ................................................ G06F 9/44
(52) U.S. Cl. ...................... 719/315; 709/223; 719/310; 719/316
(58) Field of Search ................................ 709/223, 310, 709/316, 315

(56) References Cited

U.S. PATENT DOCUMENTS 6,035,303 A * 3/2000 Baer et al. ............... 707/103 R

OTHER PUBLICATIONS

Matena et al., Enterprise JavaBeans v. 1.0, Mar. 21, 1998, Sun Microsystems Inc., pp. 1–17, 49–95, 111–120, 130–132, 160–162.*
Ryan et al., Schema for Representing Java Objects in an LDAP Directory, pp. 1–12, Sun Microsystems Inc.*
Salo T et al. "Object Persistence: beyond serialization" Dr. Dobb's Journal, May, 1999, Miller Freeman USA, vol. 24, No. 5, pp. 19, 22, 24–27, 30–33. –XP–000925486.
Bridon P. "Comment Stocker Les Objets?" No. 6, 1 Juin 1998 pp. 73–76 (XP–000780528).
Hill J et al. "Persistence in Enterprise JavaBeans applications" Jul.–Aug. 1999, vol. 12, No. 4, pp. 6–10 (XP002142904).
Srinivasan v et al. "Object Persistence in Object–Oriented Applications" IBM Systems Journal, US, IBM Corp. Armonk, NY vol. 36, No. 1, 1997, pp. 66–87 (XP000685709).
The Object People "A White Paper: TOPLINK for Java" en ligne! 1997, Ottawa, Canada (XP002098153).
Anonymous "Supporting LDAP Multi0Value Attributes with Relational Tables" Research Disclosure vol. 42, No. 417, Jan. 1, 1999 (XP–002143885).
"Implement LDAP Search Queries with SQL" Research Disclosure, GB, Industrial Opportunities Ltd. Havant, No. 416, Dec. 1998, pp. 1663–1665 (XP–000834136).

* cited by examiner

Primary Examiner—Meng-Al T. An
Assistant Examiner—Diem Cao
(74) Attorney, Agent, or Firm—Edward J. Kondracki; Miles & Stockbridge P.C.

(57) ABSTRACT

The present invention relates to a method for managing the persistence of EJB components (8) integrated into an EJB server (3) of a computer system (1), consisting of managing the persistence through an LDAP directory (4) by:
  deploying EJB components that integrate information into the LDAP entries of the directory (4);
  exchanging information between a client (2) and the LDAP directory (4) while performing a conversion using conversion classes (25) in order to perform operations required by the client (2);

The present invention also relates to the system for implementing said method.

16 Claims, 3 Drawing Sheets

FIG.1

| Key | Values |
|---|---|
| IUM_Name | Dupont |
| IUM_Date | 21_September_1999, 22_October_1999 |
| IUM_Age | 22 |

| Key | Conversion Instance | Cardinality |
|---|---|---|
| IUM_Name | IUM_String | Mono-valued |
| IUM_Date | IUM_Date | Multi-valued |
| IUM_Age | IUM_Integer | Mono-valued |

SYSTEM AND METHOD FOR MANAGING THE PERSISTENCE OF EJB COMPONENTS IN A DIRECTORY ACCESSED VIA LDAP

BACKGROUND OF THE INVENTION

1. Field of the Invention

The present invention relates to EJB, or Enterprise JavaBean (registered trademark) technology, and more specifically, the persistence of EJB components in a directory accessed via LDAP in a computer system.

2. Description of related Art

EJB technology defines an architecture for deploying and executing distributed applications. The purpose of the specification of this architecture is to facilitate and standardize the development, deployment and assembly in computer platforms of applicative software components known as EJB components. EJB components are portable, transaction-oriented, protected, multi-user, and database-oriented. They are not only independent from the machine in which they are installed and its operating system, but also from the platform to which said machine belongs.

LDAP (Lightweight Directory Access Protocol) technology is currently an open standard defining a method for accessing and updating data in a distributed directory service. Throughout the following description, an EJB component is persistent when its state is saved in a storage means. Currently, the only storage means supported in the EJB specifications for the persistence of EJB components is a relational database, accessed through the standard interfaces JDBC (Java Database Connectivity) and JSQL (Java SQL). The specification of EJB technology does not include the capability to make EJB components persistent in a directory accessed via LDAP.

One object of the present invention consists of ensuring the persistence of EJB components in a directory accessed via LDAP.

Another object of the present invention is to ensure persistence in a way that is flexible enough to adapt to various LDAP schemas.

SUMMARY OF THE INVENTION

In this context, the present invention proposes a method for managing the persistence of EJB components integrated into an EJB server of a computer system, characterized in that it consists of managing persistence in a directory accessed via LDAP by mapping and adapting an entity EJB component to a given type of LDAP entry in a given directory.

The present invention also relates to the computer system comprising at least one client, at least one EJB server comprising EJB components, and at least one directory accessed via LDAP composed of LDAP entries, characterized in that it includes means for mapping and adapting an entity EJB component to a given type of LDAP entry in a given directory.

BRIEF DESCRIPTION OF THE DRAWINGS

Other characteristics and advantages of the invention will become clear in light of the following description, given as an illustrative and non-limiting example of the present invention, in reference to the attached drawings, in which.

DETAILED DESCRIPTION OF THE PREFERRED EMBODIMENTS

Figure 1:
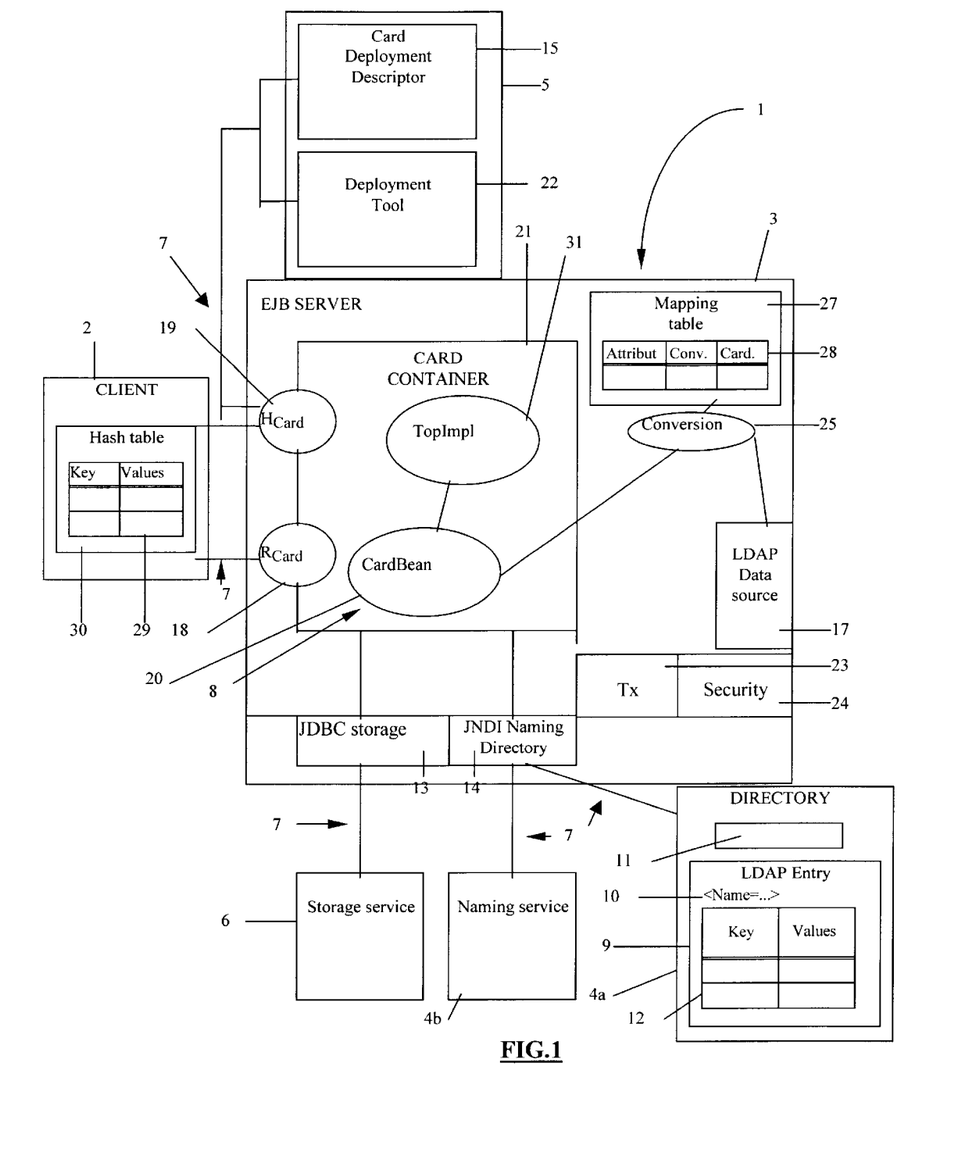
FIG. 1 is a schematic view of an embodiment of the system according to the invention.

As shown in FIG. 1, a computer system 1 is distributed and composed of machines 2 through 6 organized into one or more networks 7. A machine is a very large conceptual unit that includes both hardware and software. The machines can be very diverse, such as workstations, servers, routers, specialized machines, etc. Only the components of the machines of the system 1 that are characteristic of the present invention will be described, the other components being known to one skilled in the art.

It must be noted that the machines 2–6 are capable of being grouped together in various ways. FIG. 1 represents an exemplary embodiment of the invention.

The computer system 1 according to the present invention includes at least one client machine 2, at least one application server 3 called an EJB server, at least one resource machine 4 which, in the embodiment described, exists in the form of a directory accessed via LDAP and will hereinafter be called an LDAP directory. The system 1 is based on a three-level architecture with an application server 3.

The term application is intended in the broad sense, i.e. any software module that makes it possible to perform a set of procedures and operations designed, for example, to solve administrative, scientific or technical problems. In the example illustrated in FIG. 1, the application cannot be represented because it is composed of a large number of software modules that vary depending on the application, in machines that are equally varied.

The term "expert" in the present description designates anything that relates to the applications running in the system 1, as opposed to the infrastructure offered by the system 1.

The terms server machine 3 and resource machine 4 are intended in the broad sense, i.e. any entity respectively offering services to the client machines 2, containing information required for the running of the applications.

In the embodiment according to the invention illustrated in FIG. 1, an EJB component 8 is a software module running in the server part of the application, i.e. the EJB server 3.

The characteristics of EJB technology, of the LDAP directory, and of the JNDI interface necessary to an understanding of the invention are explained below.

In EJB technology, the EJB component 8 is portable to any type of server and operating system. The EJB component encapsulates complete behavior sets.

There are two types of EJB components in EJB technology: the EJB component of the session type and the EJB component of the entity type.

The session type of EJB component, hereinafter called a session EJB component, represents only one client in the EJB server 3. A client communicates with the EJB server by calling methods belonging to the session EJB components. A session EJB component executes a task for said client.

When the communication with the client is interrupted, the corresponding session EJB component is no longer valid; it is not persistent. The session EJB component lasts only as long as a method call or a client session.

The entity type of EJB component, hereinafter called an entity EJB component, represents a data record in a storage means such as a database. The entity EJB component 8 can be shared by several clients.

A review of the main characteristics of the LDAP directory and the JNDI interface is given below in order to allow a better understanding of the invention.

The characteristics of an LDAP directory are the following:

The data are organized hierarchically. "Branches" derive from a single "root." Each "node" can have either other branches, or "leaves."

The storage unit is called an "LDAP entry" 9 (FIG. 1). The LDAP entry 9 is either a node or a leaf.

An LDAP entry is associated with a certain amount of information that is specific to it; this information is called the "attributes" of the entry.

An entry 9 is unambiguously identified by means of a unique name 10, called the dn (distinguished name).

The LDAP directory 4 has a configuration file called the "schema" 11, which defines the various types of admissible entries.

The LDAP attributes are typed. The definition of an attribute takes place in the schema. The definition of an attribute includes a name, a type, and a cardinality. When an attribute has only one value, it is said to be mono-valued; when it can have several values, it is said to be multi-valued. The characteristic that determines whether the attribute is mono- or multi-valued is called cardinality. An attribute can be stored in an LDAP directory in various forms, particularly in the form of a character string or in the form of a byte array.

The LDAP entries are typed; an LDAP entry's type is called an "object class." The definition of an object class takes place in the schema 11. The object class is an attribute of the LDAP entry 9.

The definition of an object class includes the name of the object class, the name of the required attributes, the name of the optional attributes, an identifier OID (Object Identifier) not used in the present invention, and a superior.

The superior of an object class is the object class inherited by the LDAP entry 9 in question. Both the required and optional attributes of the superior are inherited. The superior may itself have a superior. The object class attribute assumes all the values of the inheritance tree of the object classes of the LDAP entry in question.

An LDAP directory is optimized for consultation. It is possible to retrieve a given entry by means of requests involving a large number of criteria (the presence of an attribute, the value of an attribute, a name that includes certain characters, a logical combination of several criteria, etc.).

FIG. 1 represents an LDAP entry 9. The LDAP entry 9 is represented by the dn 10 and a list 12 of attributes. Each attribute in the list 12 is constituted by a name (of a key in FIG. 1) and a series of values. The Java type of the dn is a character string. The keys and values are of the character string type; it is possible to have attribute values of the "byte array" type.

In order to manipulate the entries 9 of a directory 4, the Java language offers the types Attribute and Attributes. The Java Attribute type ("javax.naming.Directory.Attribute") in the present embodiment represents an LDAP attribute identified by a name and a series of values associated with said attribute. One line of the list 12 seen above is of the Attribute type. The Java Attributes type ("javax.naming.Directory.Attributes") represents a list constituted by a collection of elements of the Attribute type. The list 12 of the attributes of an LDAP entry is of the Attributes type.

The LDAP entry 9, as seen above, is characterized by a name (dn 10) of the character string type and by a series of objects of the Attribute type forming a single object of the Attributes type (list 12). The name is partially formed by the <attribute name, attribute value> pair of a particular attribute called the naming attribute.

The operations for read/write access to the data in the databases are performed by means of an application program interface API. A JDBC API 13 offers read/write access to a relational database; the base stores persistent information. A JNDI (Java Naming and Directory Interface) API 14 allows read/write access to various naming and/or directory services, for example including a directory service accessed via LDAP.

The present invention relates to the persistence of entity EJB components in the LDAP directory 4.

Persistence means that the data stored in the adapted storage means of the entity EJB component 8 outlast the life of the application in question or of the EJB server 3 containing the EJB components 8.

In the present invention, the database used to manage the persistence of the EJB components is the LDAP directory 4. The API that makes it possible to access LDAP is the JNDI API 14.

The present invention is based on the entity EJB component 8. The computer system 1 according to the present invention includes means that make it possible to map and adapt an entity EJB component 8 to a given object class in a given directory.

According to a first embodiment of the system 1, the mapping and adapting means comprise at least one deployment descriptor 15.

The deployment descriptor 15 establishes the correspondence between an EJB component 8 and an object class of the directory 4, which means that the information required to establish the correspondence between an EJB component and an object class is contained in the deployment descriptor. The deployment descriptor 15 also associates the EJB component 8 with a context of a given directory 4.

The deployment descriptor 15 makes it possible to adapt the EJB component 8 to the LDAP schema 11. The deployment descriptor in the present embodiment (Annex 1—Card.properties) comprises the following three pieces of mapping information:

two pieces of information for mapping with the schema of the directory: the values of the object class attribute ("objectClass"), and the name of the attributes of this object class ("attributes");

a piece of information for mapping with the context of the directory: the name of a data source 17 ("datasource.name") on which the EJB component works.

The EJB server comprises at least one software module called a data source 17, in which a particular JNDI working context, and hence a particular LDAP working context, is referenced. The data source 17 is a logical entity to which connections can be opened in order to perform operations on data: said data are outside the EJB server and stored in the directory 4 accessed via LDAP through JNDI. Each data source 17 allows operations in a particular context. The data source 17 on which the EJB component 8 works is indicated in the deployment descriptor 15. In the present invention, the data source used is an LDAP data source; an LDAP data source makes it possible to obtain a JNDI working context. Requests for creation, modification, deletion, searching and reading are executed in said working context.

According to a second embodiment, the mapping and adapting means are integrated into the EJB component. They receive adaptation information issued by the client 2 and retrieve the information for mapping with the schema from said adaptation information. The mapping information is identical to that in the first embodiment. The information for mapping with the context, i.e. the name of the data source 17, is retrieved in the same way as in the first embodiment, i.e., from the deployment descriptor 15.

All the values of the object class attribute can be retrieved from the value of the lowest object class in the hierarchy; the latter is called the characteristic object class COC. The various values of the object class, the list of required attributes, and the list of optional attributes can be retrieved as a function of the characteristic object class COC.

The adaptation information transmitted by the client 2 includes the characteristic object class COC.

The entity EJB component 8 in the example illustrated in FIG. 1, the Card component, comprises the following parts:
  a remote interface class 18 (per the EJB specifications), which represents the client view of the component 8. The remote interface class 18 contains the signatures of the expert methods of the component such as, for example, the method "get( )" for retrieving an LDAP entry and the method "set( )" for modifying an LDAP entry. The signature of a method is constituted by the name of the method, all of the parameter types used by the method, and the type returned by the method. Annex 2 constitutes an exemplary coding of the remote interface class in which the signatures are visible: the method "get( )" has the signature "public Hashtable get( )" and the method "set( )" has "public void set(Hashtable h)". FIG. 1 represents an instance 18 of the remote interface class of the Card component, $R_{card}$, hereinafter called the remote interface 18.
  a home interface class (per the EJB specifications), which includes the signatures of the methods used to manage the life cycle of the EJB component. One method for managing the life cycle, the creation method "create( )", is given in the example illustrated in Annex 3 (Annex 3 constituting an exemplary coding of the home interface class). The signature of the method "create( )" is "public Card create(Hashtable h)". The management methods can also include the deletion method "remove( )" or the component search method "findBy( )". FIG. 1 represents an instance 19 of the home interface class of the Card component, $H_{card}$, hereinafter called the home interface 19.
  a class 20 of the component 8 implementing the expert methods, as well as all the methods that allow the EJB server to manage the life cycle of the EJB component: "ejbCreate( )", "ejbRemove( )", "ejbFind( )", "get( )", "set( )", "ejbLoad( )", "ejbStore( )",etc. The method "create" of the home interface class 19 corresponds to the method "ejbCreate" of the class 20 of the component. The interfaces 18 and 19 do not contain the signatures of the methods "ejbLoad", "ejbStore" since these methods are not called by the client 2 but are necessary only to the EJB server (in order to load the instance of the component in question into memory or dumping it onto a disk). The client 2 uses the expert methods of the component 8 via the remote interface 18 and uses the management methods via the home interface 19. FIG. 1 represents an instance 20 of the class of the Card component, CardBean, hereinafter called the component instance 20.

The interface between the EJB component 8 and the EJB server 3 is constituted by a so-called container module 21. The system 1 comprises the machine 5, called the deployment machine 5, that allows the EJB component 8 to be deployed; the deployment specifically consists of writing the deployment descriptor and generating the classes 18, 19 20 and the container 21. The EJB components 8 are reusable and configurable. The EJB component 8 is integrated into the EJB server 3 without modifying the source code of said component. The component is configured during the deployment, by means of a deployment tool 22, from the deployment descriptor 15 of the component 8. In order to configure the component, the tool 22 manipulates the deployment descriptor 15 and not the component 8 itself. The descriptor 15 contains the properties ("CardProperties" in Annex 1) of the component that can be edited during deployment. A container 21 is created for each type of EJB component 8 in the server during deployment. The server 3 can accommodate several containers. In the present embodiment, the mapping and adapting means comprise the deployment tool 22 and the deployment descriptor 15.

The Card container 21 controls the EJB component 8 it contains. The persistence of the EJB component 8 is managed in the container 21 by the server 3 in a way that is completely transparent for the client 2 that is using it.

The EJB server 3 manages the container 21 and reveals the expert methods of the EJB component to the client 2.

The EJB server 3 that supports the execution environment of the EJB components offers all of the services required for the operation of the EJB components, such as a transaction service 23 (Tx in FIG. 1) and a security service 24, and uses the storage services 4a and 6 and the naming service 4b. The transaction service 23 is dedicated to managing the execution of transactions, operations performed between two interconnected computers (the machines 3 and 4a in FIG. 1, for example), either or both having a database. The security service 24 ensures the protection of the server 3, particularly by controlling access to the data. The storage service 6 is accessed from the JDBC application program interface API 13. The storage 4a and naming 4b services are used via the JNDI API 14. The JNDI interface 14 is used for naming and storage in the present embodiment.

Since the server 3 has transaction, security, naming and storage services, a developer does not have to provide said services and can concentrate on the expert logic of the application. The developer codes the expert logic into the EJB components 8, which are reusable and can be accessed by applicative client programs of the client machines 2, by extension called clients 2.

The system 1 according to the present invention comprises at least one conversion class 25 that makes it possible to transform an object seen by the client into an object seen by the directory 4 and vice versa.

For each type of LDAP attribute, there is one conversion class, all of the conversions making it possible to transform the set of attributes seen by the client into a set of attributes seen by LDAP and vice versa.

Figure 3:
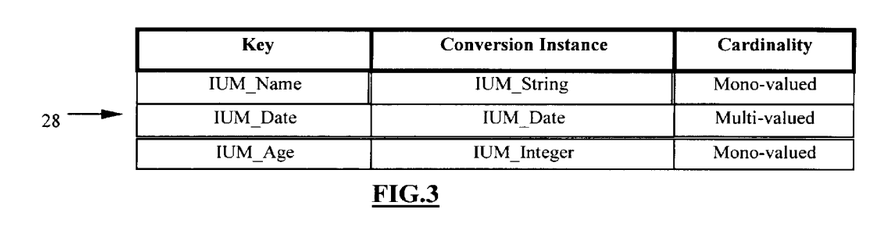
FIG. 3 is an example of a conversion table represented in FIG. 1.
Figure 4:
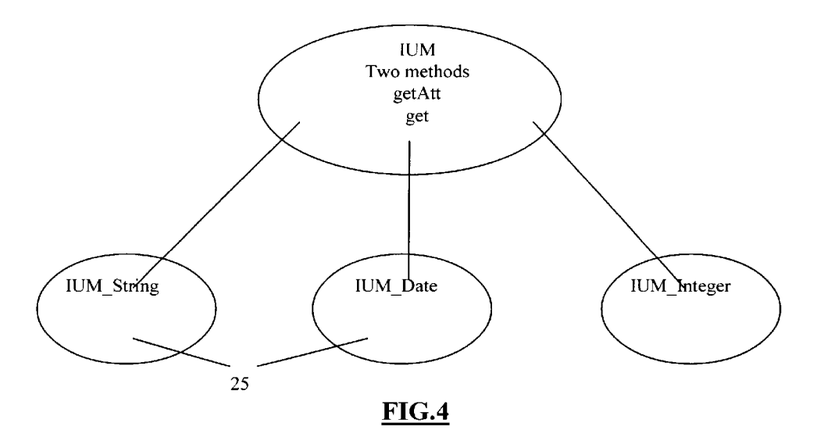
FIG. 4 is a diagram representing an example of conversion classes represented in FIG. 1.

Annex 4 shows an exemplary coding of the conversion class 25. Each class is associated with a given type of LDAP attribute and has two methods "get( )" (whose signature is "public Object get(Object value, int card)") and "getAtt" (whose signature is "public BasicAttribute getAtt(String key, Object value, int card)") for converting an attribute seen by LDAP into an attribute seen by the client (method "get( )"), or converting an attribute seen by the client into an attribute seen by LDAP (method "getAtt( )"). As seen in FIGS. 3 and 4 for example, the conversion classes IUM_String, IUM_Date, IUM_Integer, each corresponding to an attribute type IUM_Name, IUM_Date, IUM_Age, implement the same IUM interface, which includes the conversion methods "get( )" and "getAtt( )" (the term IUM does not cover any particular meaning and has been chosen as a prefix for identifying the conversion classes). All of a client's attributes (gathered into a client entry) are transformed to build the set of attributes (of the Attribute type) that form the LDAP entry (all of the attributes of the Attribute type are gathered into a structure of the Attributes type). The principle derived from the conversion classes is extendable, meaning that any new attribute type can be supported: a new conversion class adapted to this new type need only be added.

The system comprises means 27 for storing conversion tables (FIGS. 1 and 3) defining the instance of the conversion class 25 adapted to the type of attribute processed.

The conversion tables 28 establish the correspondence between the type of the attribute processed, and the conversion class instance and cardinality associated with said attribute type. In addition, the conversion tables 28 associate the type of attribute processed with the type of storage in LDAP (character string or byte array).

During the creation of the conversion table, the instances of the table are created and associated with the attribute type.

The client machine 2 gathers the data of an LDAP entry to which an instance of an EJB component corresponds, in the form of a client entry 29 as shown in FIG. 1, contained in storage means 30. The client entry 29 includes a set of attributes, each attribute being identified by a key and associated with at least one value.

In the embodiment illustrated in the annexes, the format used to represent the data of a conversion table 28 and a client entry 29 is a hash table (the type "java.util.Hashtable" or "hashtable" in Java language). Each attribute of the client entry 29 is represented by a line in the hash table.

According to one development of the invention, the code of the persistence is made generic: the code is common to the various types of LDAP entries and is made specific to an entry type during deployment and instantiation (first embodiment of the development) or during instantiation (second embodiment of the development).

According to the first embodiment of said development according to the invention, the system 1 comprises:

a generic implementation class 31 common to the various types of EJB components 8, which implements methods used by the client 2 and methods that make it possible to manage the life cycle of the EJB component 8;

at least one EJB component class 20 that inherits methods from the class 31 and that implements methods for accessing mapping information.

In the example illustrated in FIG. 1, the first embodiment of said development corresponds to the first embodiment of the system 1 described above.

The generic implementation class 31 (see Annex 5 representing an exemplary coding of a generic class), called TopImpl, implements the methods of the life cycle of an EJB component 8, i.e. the methods the EJB component requires in order to be integrated into an EJB server and the expert methods required to read/modify the LDAP entries. The code is generic in the sense that it is common to various types of LDAP entries; it is made specific to an LDAP entry type by the deployment descriptor. The code is generic and factored into the generic implementation class 31. All of the EJB components that must be made persistent in LDAP inherit methods from the generic implementation class; the home 19 and remote 18 interfaces include the signatures of the respective management and expert methods inherited from the generic implementation class. The mapping and adapting means are partially contained in the generic implementation class 31; the code of the persistence is developed in the generic implementation class TopImpl 31 and the mode of persistence is therefore explicit, since it is present in the code of the EJB component itself.

A component instance 20 is represented in FIG. 1. The generic implementation class 31 is represented so as to display the inheritance of the methods by the instance 20.

Figure 5A:
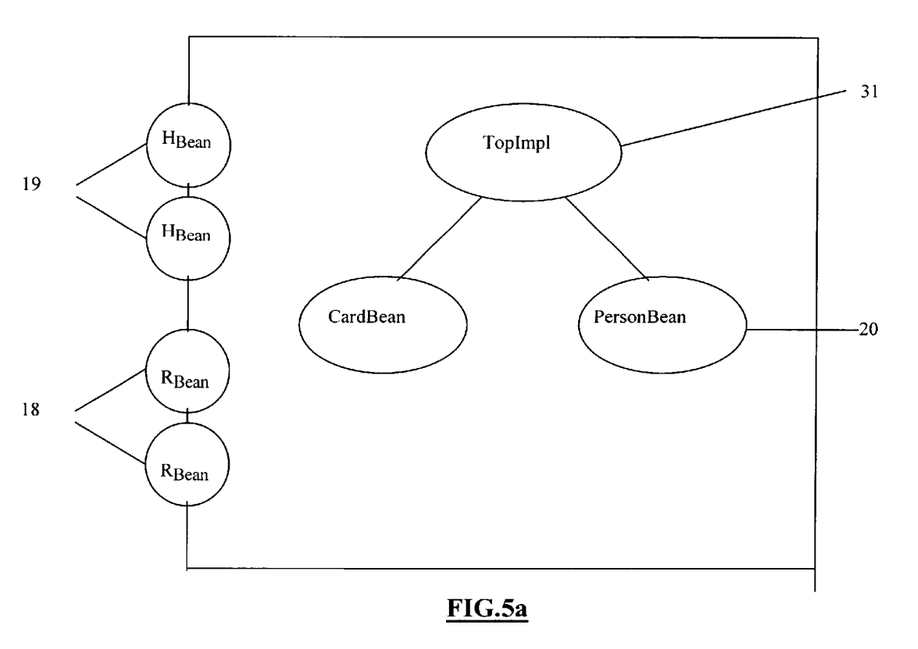
FIGS. 5a and 5b represent two embodiments of EJB components in generic form in the system according to the present invention.

We see in FIG. 5a two types of classes 20 of EJB components 8 (CardBean and PersonBean) that inherit from the generic implementation class 31. Annex 6 is an exemplary coding of an EJB component class 20; Annex 6 shows the inheritance of the generic class: "CardBean extends TopImpl". The class 20 of the component 8 CardBean stores information specific to all the instances of EJB components of the Card type. Said information is read- and write-accessible by a set of methods for accessing static variables (methods "getCtx( )", "setCtx( )", "getAttribs( )", "setAttribs( )", "getObjClass( )", "setObj Class( )", "getAttribsName( )" and "setAttribsName( )"). Said access methods allow the generic implementation class TopImpl to access the mapping information common to all the instances of the same EJB Card component. Said mapping information, mentioned above, is: the JNDI working context (accessible by "setCtx( )", "getCtx( )"), the values of the object class (accessible using "getObjClass( )", "setObjClass"), and the list of the attributes of the entry (accessible by "getAttribsName( )", "setAttribsName( )"). The static variables are integrated into the mapping and adapting means in the component class 20. Said mapping information is configuration information for the component and is initially located in the deployment descriptor 15; it is loaded into memory in the static variables during the instantiation of the EJB component class 20 in question.

Figure 5B:
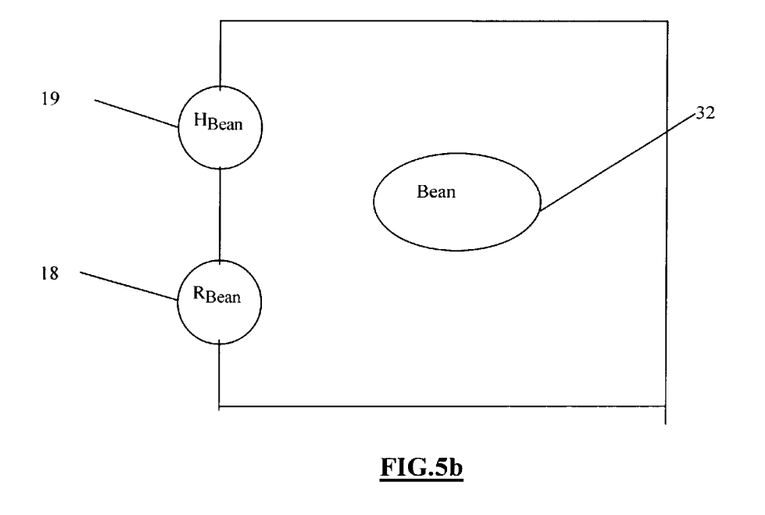

In a second embodiment according to the invention, the system 1 includes a generic EJB component class 32 (FIG. 5b). It is generic in that it can be adapted to various types of LDAP entries.

The second embodiment of said development corresponds to the second embodiment of the system 1 described above. The mapping and adapting means are integrated into the generic component class 32. They comprise instance variables.

FIGS. 5a and 5b show the differences between the first and second embodiments of the development with respect to genericity, according to the present invention. Both embodiments make it possible to render the manipulated information generic in order to simplify the management of the system and the method for managing persistence.

According to the first embodiment illustrated in FIGS. 1 and 5a, each of the component classes EJB, CardBean, PersonBean can interface with only one type of LDAP entry. During the deployment of the EJB components, the EJB components inherit behavior from the generic class 32.

According to the second embodiment, the generic EJB component class can interface with various types of LDAP entries. An EJB component corresponds to various types of LDAP entries. The various types of entries are managed by the same generic EJB component class, but for each LDAP entry, there is a different corresponding instance of this generic component class. The system according to the invention comprises only one remote interface, only one home interface, only one generic component class, only one deployment descriptor.

In both embodiments, the conversion table 28 is used to contain the information required to transform client attributes into LDAP attributes and vice versa.

The method according to the present invention manages the persistence of the EJB components 8 integrated into the EJB server 3 of the computer system 1 through the LDAP directory 4, and consists of mapping and adapting an entity EJB component 8 to a given type of LDAP entry 9 in a given directory.

The method consists of deploying instances of an entity EJB class 18, 19, 20, 31, 32 that integrate the mapping information into the LDAP entries 9 of the LDAP directory contained in the deployment descriptor and/or retrieved from adaptation information transmitted by the client 2.

The method according to the present invention interfaces the LDAP directory with the JNDI API in order to create, read, modify, search for and/or delete the various types of LDAP entries by adapting to the LDAP schema, either statically by deploying the EJB component (first embodiment of the method according to the invention) or dynamically (second embodiment), in order to ensure the persistence of the EJB components of an EJB server.

The method according to the present invention maps an EJB component to an object class.

The management method works in the following way in the system according to the first embodiment.

During deployment, the mapping information of the EJB component 8 is written into the deployment descriptor 15, i.e. the object class, the names of the attributes of the LDAP entry, the data source 17. Said mapping information is required to adapt the generic code of the generic implementation class 31 to the operation of a derived class 20 associated with a given object class. In the example illustrated in FIG. 1, the deployment generates the EJB component class CardBean 20, the generic class TopImpl 31, the class of the remote interface 18, the class of the home interface 19, and the Card deployment descriptor 15.

When required by a client call, the server creates an instance of an EJB component. Upon instantiation, the instances 20 inherit behaviors (creation, deletion, modification, reading, searching, etc.) from the generic class 31. The mapping information is loaded into memory, i.e. copied into the instance 20 of the EJB component class. The name of the data source 17 is then transformed into a JNDI working context. The mapping information is stored in the static variables of the EJB component. All the instances 20 of EJB component classes behave in the same way, i.e., the way dictated by the generic class but customized by the mapping information from the deployment descriptor. For each type of LDAP entry managed by the LDAP directory, there is a corresponding type of EJB component, complete with a home interface, a remote interface, a component class instance, and a deployment descriptor. For each different entry of the same type, there is a corresponding different instance of said component.

The client executes method calls through the home interface 19 of the component in question in order to create, delete, modify or search in the LDAP directory. As seen above, the format of the information seen by the client (the client entry 29 in the embodiment described) and the format of the information in LDAP (the LDAP entry 9) requires a conversion to be performed between the client and the LDAP directory 4 exchanging this information.

The method according to the present invention consists of exchanging information between the client and the LDAP directory while performing a conversion by means of at least one conversion class 25.

The exchange that consists in the creation of an LDAP entry 9 from a client entry is described below. According to one embodiment, the client 2 transmits the information, in the form of a hash table representing the client entry 29, to the EJB component through the home interface $H_{card}$.

Figure 2:
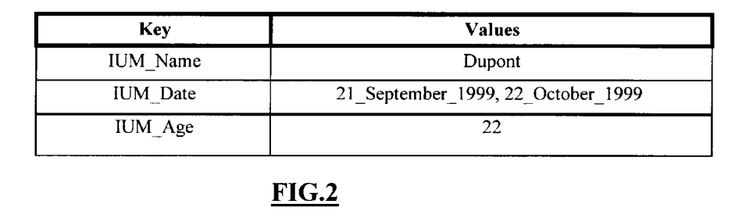
FIG. 2 is an example of a client entry represented in FIG. 1.

As shown in FIG. 2, the client entry 29 is constituted by a list of attribute names (keys in FIG. 1), such as for example the attribute IUM__Date, and one or more values associated with this attribute, for example "21__Sep.__1999", "22__ Oct.__1999" (FIG. 2).

The method specifically consists of transforming the entry seen by the client into an LDAP entry. As seen above, the LDAP entry is characterized, at the client level, by said hash table containing the various attributes, and at the LDAP level by the dn of the character string type and by the collection of objects of the Attribute type forming a single object of the Attributes type. The entry sent by the client, i.e., the hash table representing the client entry 29, is scanned line by line. Based on the attribute type of the line in question, the method searches for the instance of an adapted conversion class in the conversion table 28. There exists one conversion class instance per attribute type. The conversion class adapted to an attribute knows the transformation to be performed between an attribute seen by the client and an LDAP attribute (of the Attribute type). For example, as shown in FIG. 2, the first line of the client entry scanned is the attribute IUM__Name. The associated conversion class instance in the conversion table represented in FIG. 3 is an instance of the class IUM__String, which makes it possible to manipulate attributes of the IUM__Name type with monovalued cardinality. The methods for transforming attributes of the conversion class obtained (the method "getAtt( )" in the example illustrated) are called as many times as there are lines in the client hash table.

In the example illustrated, the transformation method "getAtt( )" is called in order to transform the attribute IUM__Name of the client hash table into an object of the Attribute type of the LDAP entry. The method "getAtt( )" returns an object of the Attribute type based on the name of the attribute, IUM__Name, its values given by the client entry, and its cardinality. After the scanning of the client entry, the method builds the object of the Attributes type from the various objects of the Attribute type.

The method then consists of obtaining the name of the LDAP entry in question. During the scanning of the client entry, the method retains the particular attribute dedicated to naming, the attribute IUM__Name in the example described, and integrates it into a character string. The character string is constituted by the attribute in question, the = sign and the value assumed by the attribute:

"IUM__Name=Dupont".

The context of the LDAP entry in the LDAP directory is obtained from the LDAP data source 17 indicated in the deployment descriptor. The method according to the present invention creates the LDAP entry, composed as described above, in the part of the LDAP directory indicated by the context.

The method for loading into memory using the method "ejbLoad( )" consists of performing a search in LDAP by building a particular LDAP search filter. All of the LDAP entries 9 have a piece of distinctive information (IUM_ld in our example) whose value is unique for each of the entries. Any other information, such as the dn, could also be used. The server generates the values of these IUM_lds during the creation method described above, using a unique key generating algorithm. If the method performs an LDAP search with a search filter based on this distinctive information, only one LDAP entry is loaded. The server retrieves the key associated with the instance 20; the value of the key corresponds to the value of this distinctive information. The loading method makes it possible to retrieve the entry and load it into memory.

Similar mechanisms are used to transform an LDAP entry into an object seen by the client. The information required to modify, delete, store, load and read is supplied by the same constituent elements of the system 1, and more specifically the deployment descriptor, the conversion class and the conversion table, using mechanisms similar to those of the method for creating an LDAP entry described above.

According to a second embodiment of the method according to the invention, the client 2, during the instantiation of the generic EJB component 32 activated by a client call, transmits a piece of adaptation information, the COC, to the LDAP entry 9 of the LDAP directory 4 of the system 1. Each instance of the generic EJB component 8 behaves differently depending on the information provided by the client during the instantiation. The genericity of the EJB component is made specific to one type of LDAP entry by retrieving from the adaptation information the mapping information related to this type of LDAP entry dynamically, i.e. during the instantiation.

The method consists of directly interrogating the LDAP schema, using the mapping and adapting means, in order to retrieve the lists of required and optional attributes, based on the COC transmitted. The data source 17 is obtained, as in the first embodiment, from the deployment descriptor. The mapping and adapting means integrate said obtained mapping information into the instance variables.

The method according to the second embodiment consists of exchanging information between the client 2 and the LDAP directory 4 while performing a conversion in the same way as form the method according to the first embodiment.

According to one development of the present invention, the method makes it possible to optimize read and write access. In essence, since the expert methods are not transaction-oriented, their execution in the server is always preceded by an "ejbLoad( )" and always followed by an "ejbStore( )" indicating that the component class instance has been read- or write-accessed. A flag is added as a variable of the generic implementation class or the generic component class. The flag is inherited by each instance of an EJB component class. The flag indicates whether or not the memory state of the EJB component is different from the state of the component in the LDAP directory. For example, the flag is represented by a Boolean variable called isModified, whose default value is true:

Boolean isModified=true

If the value of the variable isModified is false, the memory state of the EJB component is equal to the state of the component in the LDAP directory.

If the value of the variable isModified is true, the memory state of the EJB component is different from the state of the component in the LDAP directory.

The flag indicates to the loading and storage methods whether or not the loading or storage must actually be done.

When the component must be loaded into memory by the EJB server, a call to the loading method is performed. The loading method does not perform any operation if the value of the flag is false. If the value of the flag is true, the loading method reloads the component from the LDAP directory into the memory and resets the value of the variable isModified to false.

When the component is modified by the set method, the variable isModified assumes the value true.

When the component is read-accessed by the get method, the variable isModified remains unchanged.

When the component must be written into the LDAP directory by the EJB server, a call to the storage method is performed. The storage method does not perform any operation if the value of the flag is false. If the value of the flag is true, the storage method writes the component into the LDAP directory and resets the value of the variable isModified to false.

The present invention relates to the method for managing the persistence of EJB components 8 integrated into the EJB server 3 of the computer system 1, characterized in that it consists of managing the persistence through the directory 4, accessed via LDAP, by mapping and adapting an entity EJB component 8 to a given type of LDAP entry 9 in a given directory.

According to a first embodiment, the method consists of mapping the entity EJB component 8 to the type of LDAP entry 9 during deployment and instantiation by integrating into at least one class instance mapping information written in a deployment descriptor 15.

According to a second embodiment, the method consists of mapping the entity EJB component 8 to the type of LDAP entry 9 during the instantiation of the component 8 by integrating into at least one class instance mapping information retrieved from a COC transmitted by a client 2.

The method according to the present invention consists of exchanging information between the client 2 and the LDAP directory 4 while performing a conversion by means of at least one conversion class 25.

The method consists of performing a load into memory by building the LDAP search filter on a piece of distinctive information whose value is unique for each LDAP entry 9 of the directory 4.

The present invention also relates to the computer system comprising at least one client 2, at least one EJB server 3 comprising the EJB components 8, at least one directory accessed via LDAP composed of LDAP entries 9, characterized in that it includes means that make it possible to map and adapt an entity EJB component to a given type of LDAP entry 9 in a given directory.

The system comprises at least one conversion class 25 that makes it possible to transform an object seen by the client 2 into an object seen by the directory 4 and vice versa.

The system comprises the means 27 for storing conversion tables 28 defining the instance of the conversion class 25 adapted to the type of attribute processed. The conversion tables 28 associate the type of attribute processed with the type of storage in LDAP.

According to a first embodiment, the system comprises:
- a generic implementation class 31 common to the various types of EJB components 8, which implements methods used by the client 2;
- at least one EJB component class 20 that inherits methods from the class 31 and that implements methods for accessing mapping information.

According to a second embodiment, the system includes the generic EJB component class 32.

According to a development of the invention, the flag indicating whether or not the memory state of the EJB component is different from the state of the component in the directory is provided.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A method for managing the persistence of EJB components (8) integrated into an EJB server (3) of a computer system (1), said computer system comprising at least one client (2), characterized in that it comprises managing the persistence through a directory (4), that is accessed via LDAP, mapping and adapting an entity EJB component (8) to a given type of LDAP entry (9) in a given directory through a generic implementation class (31) common to various types of EJB components (8) that implement methods used by the client (2), and at least one EJB component class (20) that inherits methods from the generic class (31) that implements methods for accessing mapping information.

2. The method according to claim 1, characterized in that it comprises mapping the entity EJB component (8) to the type of LDAP entry (9) during deployment and instantiation by integrating into at least one class instance mapping information written in a deployment descriptor (15).

3. The method according to claim 2, characterized in that it comprises exchanging information between the client (2) and the LDAP directory (4) while performing a conversion by means of at least one conversion class (25).

4. The method according to claim 2, characterized in that it comprises performing a load into memory by building an LDAP search filter on a piece of distinctive information whose value is unique for each LDAP entry (9) of the directory (4).

5. The method according to claim 1, characterized in that it comprises mapping the entity EJB component (8) to the type of LDAP entry (9) during the instantiation of the component (8) by integrating into at least one class instance mapping information retrieved from a Characteristic Object Class (COC) transmitted by the client (2).

6. The method according to claim 5, characterized in that it comprises exchanging information between the client (2) and the LDAP directory (4) while performing a conversion by means of at least one conversion class (25).

7. The method according to claim 5, characterized in that it comprises performing a load into memory by building an LDAP search filter on a piece of distinctive information whose value is unique for each LDAP entry (9) of the directory (4).

8. The method according to claim 1, characterized in that it comprises exchanging information between the client (2) and the LDAP directory (4) while performing a conversion by means of at least one conversion class (25).

9. The method according to claim 8, characterized in that it comprises performing a load into memory by building an LDAP search filter on a piece of distinctive information whose value is unique for each LDAP entry (9) of the directory (4).

10. The method according to claim 1, characterized in that it comprises performing a load into memory by building an LDAP search filter on a piece of distinctive information whose value is unique for each LDAP entry (9) of the directory (4).

11. A computer system comprising at least one client (2), at least one EJB server (3) having EJB components (8), at least one directory (4) accessed via LDAP composed of LDAP entries (9), means for mapping and adapting an entity EJB component (8) to a given type of LDAP entry (9) in a given directory, a generic implementation class (31) common to the various types of EJB components (8) that implements methods used by the client (2); and at least one EJB component class (20) that inherits methods from the class (31) and that implements methods for accessing mapping information.

12. A computer system according to claim 11, further comprising at least one conversion class (25) for transforming an object seen by the client (2) into an object seen by the directory (4) and vice versa.

13. A computer system according to claim 12, further comprising means (27) fur storing conversion tables (28) defining the instance of the conversion class (25) adapted to the type of attribute processed.

14. A computer system according to claim 13, wherein the conversion tables (28) associate the type of attribute processed with the type of storage in LDAP.

15. A computer system according to claim 11, further comprising a generic EJB component class (32).

16. A computer system according to claim 11, further comprising a flag for indicating whether or not the memory state of the EJB component is different from the state of the component in the directory.

* * * * *